July 20, 1926.

J. H. BAKER

MIXER

Filed Jan. 19, 1926

Inventor
J. H. Baker.

By Lacey & Lacey, Attorneys

July 20, 1926.  
J. H. BAKER  
MIXER  
Filed Jan. 19, 1926  
1,593,056  
2 Sheets-Sheet 2

Inventor  
J. H. Baker.

Patented July 20, 1926.

1,593,056

UNITED STATES PATENT OFFICE.

JOHN H. BAKER, OF HARTWELL, GEORGIA.

MIXER.

Application filed January 19, 1926. Serial No. 82,365.

This invention relates to mixing machines and is intended primarily for use upon farms in mixing fertilizers but is adapted for use wherever granular materials are to be commingled. The primary object of the invention is to provide a machine which may be operated by hand and produced at a low cost and operated at a minimum expense. The invention also seeks to provide a hand-operated mixer which will effect a commingling of granular materials by the action of gravity in causing a flow of the ingredients from one receptacle to another receptacle. These objects, and other objects which will incidentally appear in the course of the following description, are attained in such an apparatus as is illustrated in the accompanying drawings, and the invention resides in certain novel features which will be particularly pointed out in the appended claims.

Figure 2:
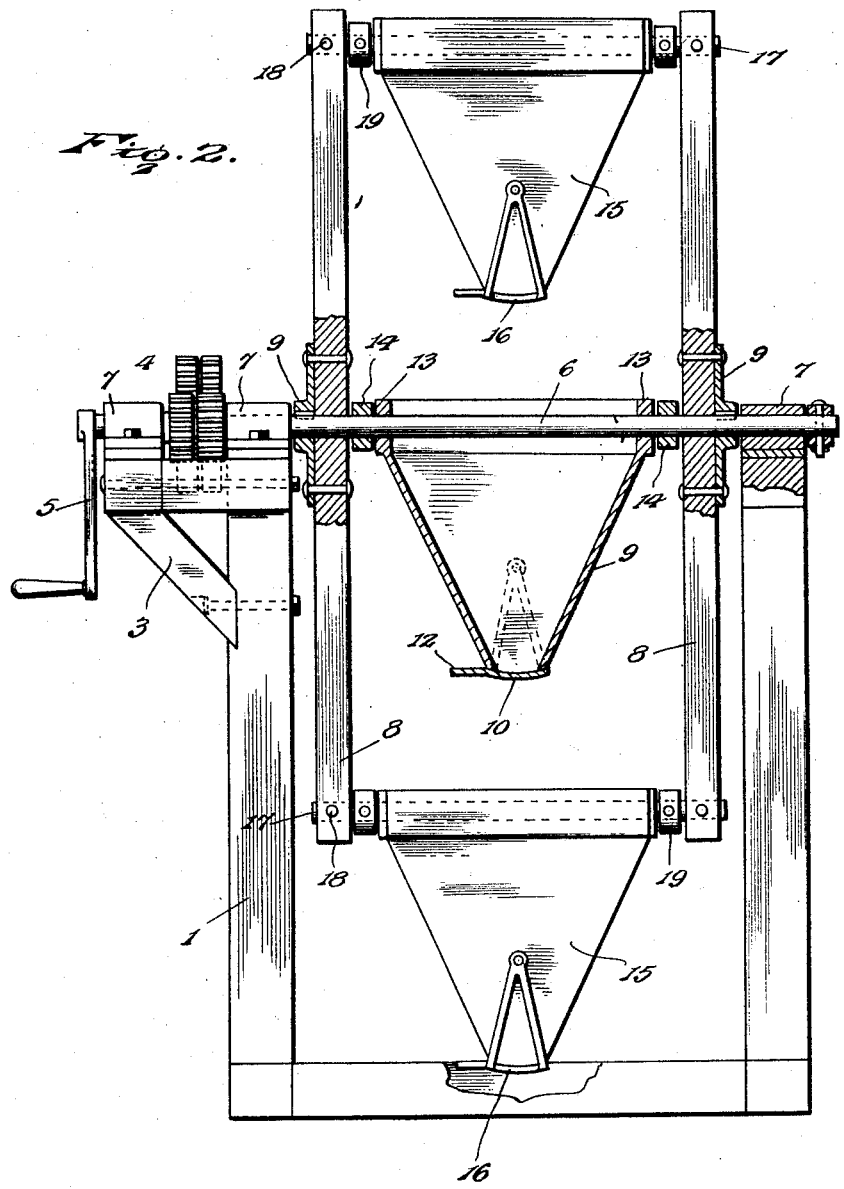
Fig. 2 is an end elevation with parts broken away and in section.

In carrying out the invention, I employ a supporting frame 1 which may be of any desired or approved form and of substantial construction so as to firmly support the working parts and maintain them in an operative condition through a long period. This supporting frame provides upper sills or beams 2 for the support of the operating mechanism and at one side is a lateral extension 3 upon which is mounted a train of gearing, indicated at 4, operated by a hand crank 5 whereby rotation is imparted to the main driving shaft 6. The train of gearing is, as will be readily noted, arranged so as to apply power without excessive speed to the driving shaft. The said shaft is rotatably mounted in suitable bearings 7 secured upon the main frame and the lateral extension 3 thereof, and between the side members of the main frame side bars or arms 8 of a rotating frame are fitted upon the said shaft and extend in opposite directions therefrom. These side bars 8 are rigidly connected to the shaft through hub plates 9 which are keyed to the shaft and rigidly secured to the outer faces of the side bars, as shown clearly in Fig. 2, so that when the shaft is rotated the said side bars or rocking frame will move with the shaft. Suspended upon the shaft between the side bars is a hopper 9 which is open at its top and unobstructed, except for the shaft, while the walls of the hopper converge downwardly so as to provide a restricted discharge opening at the lower end which discharge opening is normally covered by a cut-off 10. This cut-off is carried by side arms or hangers 11 which are pivoted at their upper ends upon opposite walls of the hopper and secured at their lower ends to the cut-off plate which is equipped at one side with a handle 12 whereby it may be manually manipulated. Preferably, the hopper is provided at its upper end with enlargements or collars 13 whereby a bearing for the shaft is produced sufficiently wide to prevent excessive wear upon the shaft, it being understood that the hopper is loose upon the shaft so that it will always remain in the perpendicular position illustrated. Between the sides of the hopper and the side bars 8, stop collars 14 are secured upon the shaft so that the hopper will remain in a central position upon the shaft and will be prevented from impinging against and wearing away the sides of the frame.

In each end of the frame consisting of the side bars 8 is mounted a hopper 15 which is the same in all respects as the hopper 9 and is equipped with a cut-off 16 duplicating in construction and arrangement the cut-off 10. The hoppers 15 are loosely mounted upon shafts or rods 17 fitted transversely through the ends of the side bars 8 and secured rigidly therein by pins or bolts 18 so that the said rods or shafts do not rotate in the side bars and also serve as braces or couplings to prevent spreading of said bars. Between the side bars of the hoppers 15 and the bars 8, stop collars 19 are secured on the respective rods, these stop collars corresponding in form and function to the stop collars 14, as will be readily understood.

Figure 1:
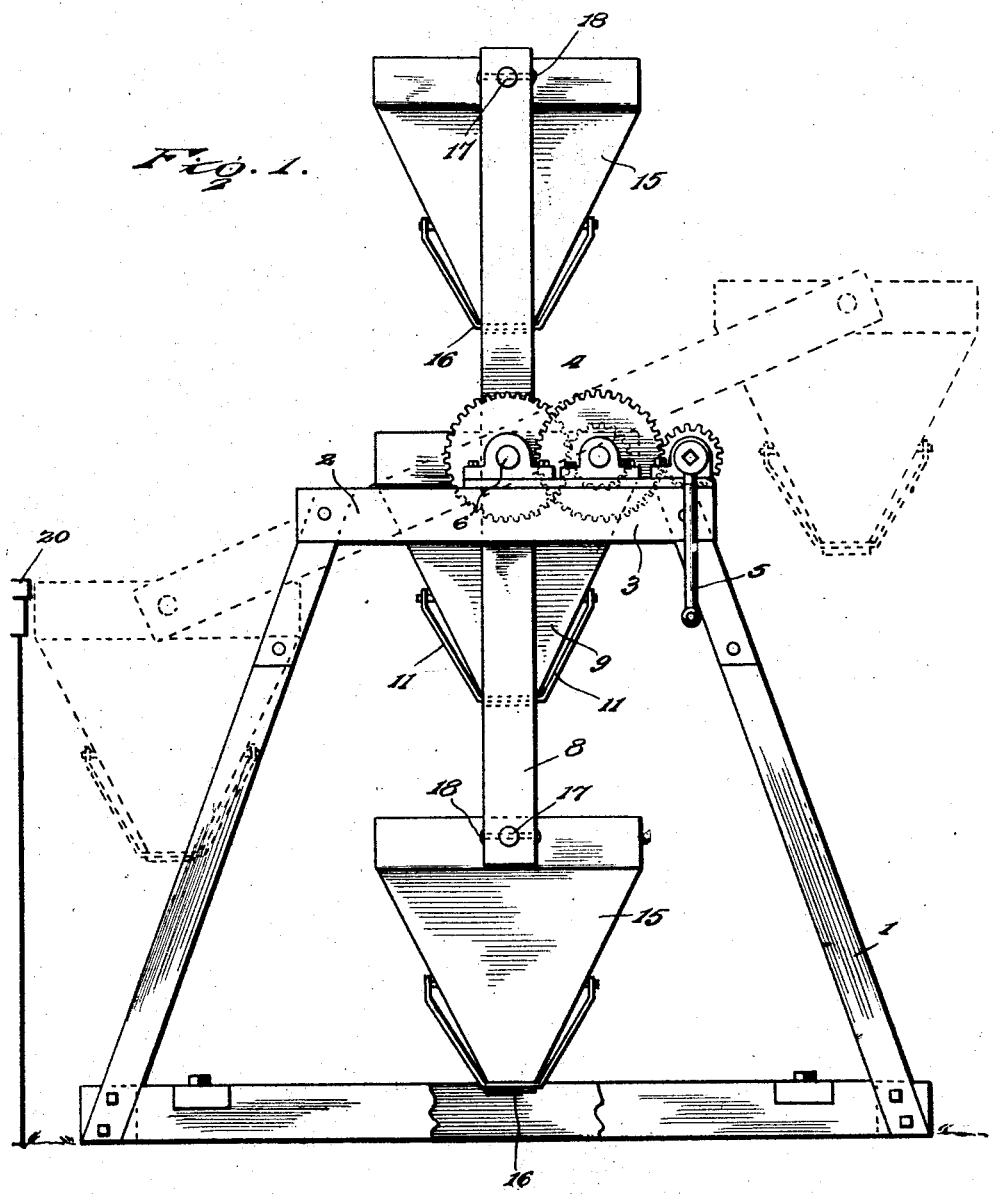
Figure 1 is a side elevation of a mixer embodying my present invention.

The operation of the machine will be readily understood from the foregoing description, taken in connection with the accompanying drawings. In setting up the machine for use. it is desirable to provide a platform or table, as indicated at 20, for the temporary support of the ingredients which are to be mixed or, if preferred, the machine may be set in a shallow pit so that the hopper to be filled may be easily reached from the surface of the ground. The device having been set up, the bars 8 are turned to the position indicated by dotted lines in Fig. 1 through manipulation of the crank handle 5, and in this position the hopper which appears at the left in Fig. 1 is filled with the several ingredients after which the gearing is operated so that the filled hopper is brought into the uppermost position shown in the drawings and will be directly over the intermediate hopper 9. With the revoluble frame in the upright position illustrated in full lines, the cut-off of the filled hopper is swung to permit the discharge of the contents of the hopper which will then at once flow by gravity into the intermediate hopper. After the entire contents of the uppermost hopper have flowed into the intermediate hopper, the discharge of said intermediate hopper is opened to permit the material to flow into the lowermost hopper, and after the lowermost hopper is thereby filled the parts are returned to the position indicated by dotted lines in Fig. 1, so that the hopper which appears uppermost in the drawings may be again filled and the hopper containing the mixed materials may be permitted to discharge into any suitable receptacle. The mixing of the materials is accomplished by the repeated transfer or flow of the material from one hopper into another hopper and some mixing will be caused by the movement of the hoppers during rotation of the hopper carrying frame. If it be desired to continue the mixing through a greater period than is provided by the described operation, the frame may be rotated after the material has been transferred to the lowermost hopper through one-half a revolution so that the filled hopper will be uppermost and the transfer of the materials through the several hoppers may be repeated.

The apparatus is exceedingly simple and may be produced at a low cost and easily operated by hand so that it will not be necessary to install an expensive operating power plant nor to incur the heavy maintenance cost required by such a plant. The machine is well adapted for the mixing of materials upon a small scale and may be used for mixing concrete or any other granular or powdered material. When made upon a small scale, it will be very advantageous for laboratory use and is well adapted for the mixing of chemicals or drugs in conducting experiments, it being possible to handle the ingredients with this machine without fear of explosions.

Having thus described the invention, I claim:

1. A mixer comprising a supporting frame, a rotatable frame mounted on the supporting frame, hoppers pivotally mounted upon the rotatable frame at the ends thereof, and a hopper supported at its upper end at the center of the rotatable frame and pivotally movable relative thereto, all the hoppers having discharge means at their lower ends.

2. A mixer comprising a supporting frame, a rotatable frame mounted at its center on the supporting frame, hoppers pivotally supported at their upper ends at the ends of the rotatable frame, an intermediate hopper pivoted at its upper end at the center of the rotatable frame, said hoppers having their walls downwardly converging, and cut-offs at the lower ends of the hoppers.

3. A mixer comprising a supporting frame, a shaft rotatably mounted on said frame, parallel side bars secured on said shaft and projecting in opposite directions therefrom, hoppers pivotally mounted at their upper ends between the ends of the side bars, a hopper mounted loosely at its upper end upon the said shaft between the side bars, all the hoppers having discharge means at their lower ends, and means on the supporting frame for rotating said shaft.

In testimony whereof I affix my signature.

JOHN H. BAKER. [L. S.]